May 13, 1969     S. O. STEWART     3,444,310
ELECTRICAL JUNCTION BOX ASSEMBLY
Filed Feb. 7, 1968     Sheet _1_ of 3
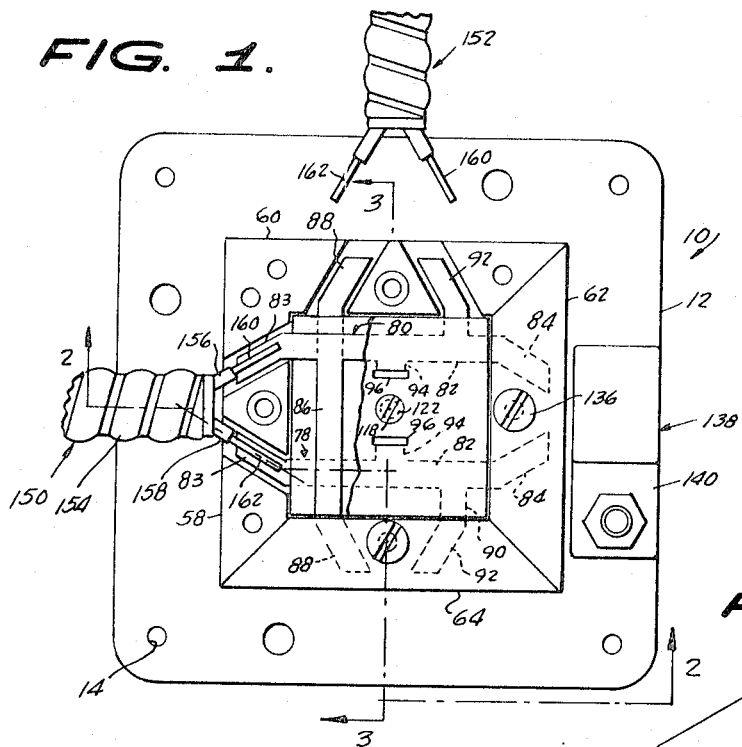
FIG. 1.
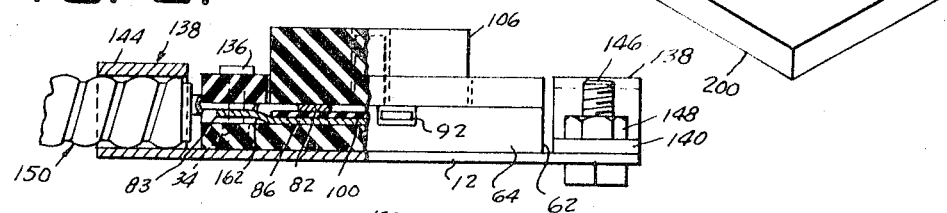
FIG. 2.
FIG. 4.
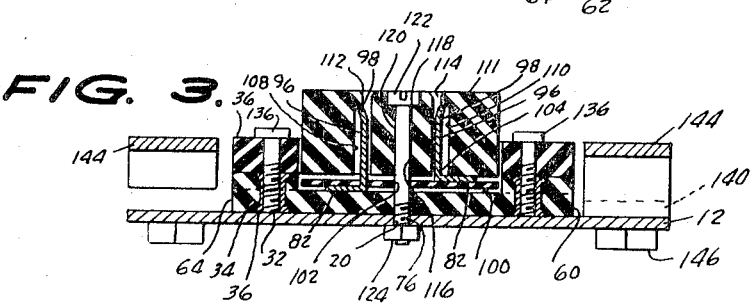
FIG. 3.
INVENTOR.
SCOTT O. STEWART,
BY Kimmel, Crowell & Weaver
ATTORNEYS.

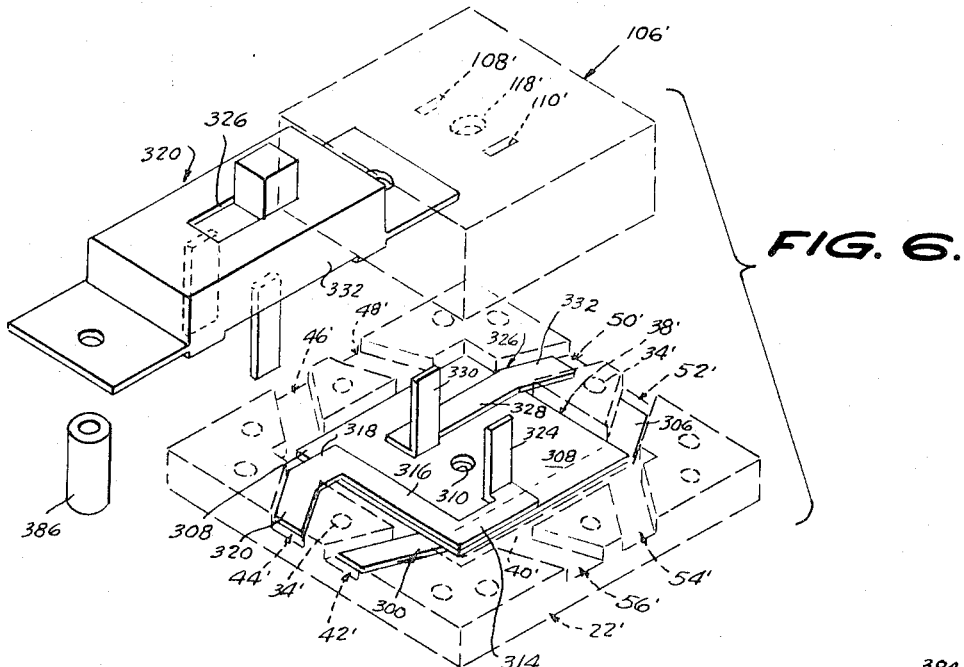
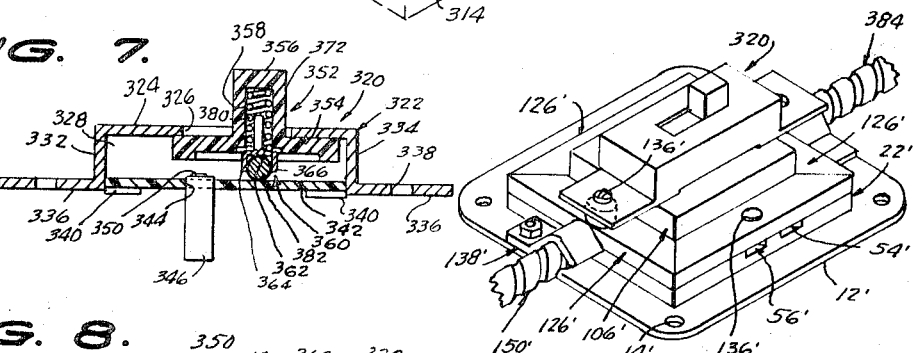
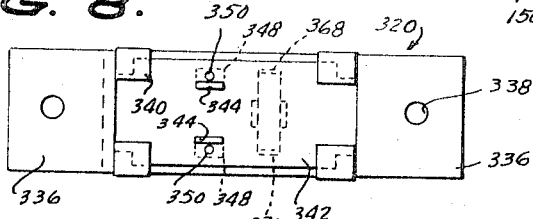
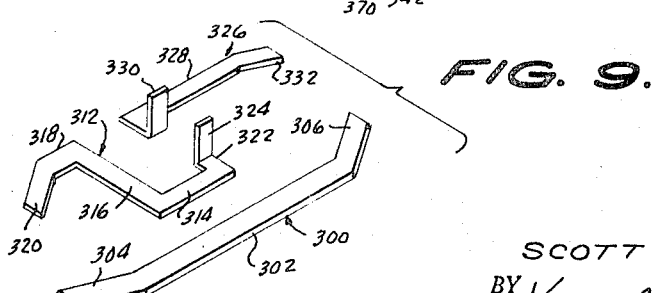

United States Patent Office 3,444,310
Patented May 13, 1969

3,444,310
ELECTRICAL JUNCTION BOX ASSEMBLY
Scott O. Stewart, 4923 Powder Mill Road,
Beltsville, Md. 20705
Filed Feb. 7, 1968, Ser. No. 703,726
Int. Cl. H01r 9/02, 13/46
U.S. Cl. 174—59
8 Claims

ABSTRACT OF THE DISCLOSURE

An electrical conductor terminal assembly for connecting a plurality of electrical circuits and wherein the assembly includes a pair of multi-ended plates electrically insulated from one another, the insulated plates being disposed on one side of an electrically non-conducting base with the ends of the plates extending transversely across the peripheral marginal edge thereof; the ends of one plate being adjacent to but spaced and electrically insulated from the ends of the other plate to form pairs of contiguous ends to receive the terminal ends of wires forming circuits to be connected with one another; an electrically non-conducting block extending across the electrically insulated plates to the exclusion of the ends thereof and means connecting the block to the base to clamp the electrically insulated plates therebetween; an electrically non-conducting clamping jaw for each pair of contiguous ends of said plates and extending thereacross; and means connecting said clamping jaws to said base to clamp said terminal ends of the wires against their associated plate ends.

Background of invention

Electrical circuit junction boxes are not new, per se, in the art, but the present invention constitutes a radical departure from known prior art devices. As such, the instant invention relates to a unique application of electric circuit packaging for use in the wiring of houses, larger publc or commercial structures, and with machines which normally require an electrical junction box. The construction of related prior art devices requires that wires twisted together are connected to the box as by tape means or by a twist-cap, and their respective excess end-lengths are generally loosely and indiscriminately housed within the junction box which is normally formed of a metallic material. Such crowded and tangled terminal ends presents an inherent danger and, of course, makes difficult the proper electrical connections.

Basically, the instant invention pertains to an electric junction box in which the electronic circuits are encapsulated or packaged. While the practice of encapsulating electronic circuits is rather common and well known in the construction of electronic devices, the fundamental principles thereof have not heretofore been adapted for electric wiring systems of the type to which reference has been made above. As will be evident from the following specification, the junction box of the present invention may constitute an original installation or a replacement for the conventional metal junction boxes used in connection with sheathed and armored cable interconnections and including all types of switches, light fixtures, outlet receptacles and/or similar connections.

The device according to this invention may be briefly described as comprising of a metal plate to which a wire, stamped or printed insulated circuit is attached. In the construction of this junction box, the fabricated, sandwiched, molded or encapsulated electronic circuits may be used with a two or three wire current carrying circuit in such a manner as to permit the juncture of a plurality of terminal connections by means of a repetitive basic circuit design. This constitutes one of the primary objects of this invention. Another object of this invention is to provide in an electrical junction box means for positively insulating and clamping wires thereto in a manner which ensures them to be mechanically and electrically secure with no strain on the terminals either entering or leaving the junction box.

A further object of this invention is to provide insulated connections thereby eliminating bare wires at all times and to make use of the available power supply at any stage of roughing-in to completion with every assurance of safety.

Still another object of this invention is to provide an electrical junction box in which means are provided for quickly and easily effecting the connection or disconnection of one or a plurality of electrical circuits.

This invention contemplates, as a still further object thereof, the provision of a device of the type generally described above and which is non-complex in construction and assembly, inexpensive to manufacture and maintain, and which is rugged and durable in use.

Other and further objects and advantages of the instant invention will become more manifest from a consideration of the following specification when read in the light of the annexed drawings.

In the drawings:

FIGURE 1 is a top plan view, partly broken away, of an electrical junction box constructed according to this invention;

FIGURE 2 is a side elevational view, partly in cross-section, of the junction box assembly shown in FIGURE 1, FIGURE 2 being taken substantially on the line 2—2 of FIGURE 1, looking in the direction of the arrows;

FIGURE 3 is a transverse cross-sectional view, FIGURE 3 being taken substantially on the vertical plane of line 3—3 of FIGURE 1, looking in the direction of the arrows;

FIGURE 4 is a perspective view of an optional main assembly block clamp;

FIGURE 6 is an exploded perspective view of a switch controlled electrical junction box according to this invention;

FIGURE 7 is a detail medial longitudinal cross-sectional view of the sliding switch forming a component of the assembly of FIGURE 6;

FIGURE 8 is a bottom plan view of the switch shown in FIGURE 7;

FIGURE 9 is an exploded perspective view of the electrical conducting plates of the assembly of FIGURE 6; and FIGURE 10 is a perspective view of the completed assembly of the device shown in FIGURE 6.

Figure 5:
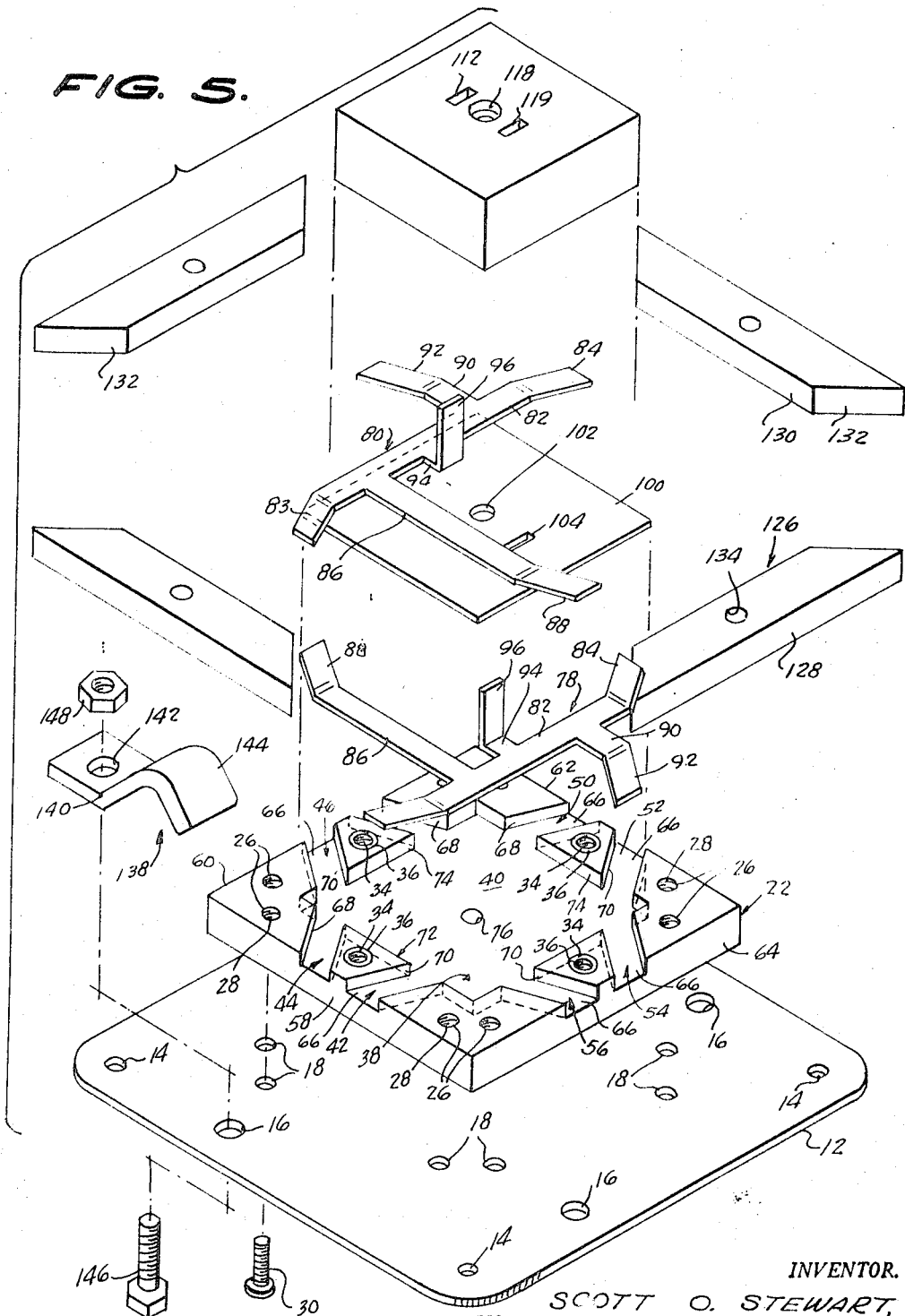
FIGURE 5 is an exploded perspective view of the junction box shown in FIGURE 1.

Referring now more specifically to FIGURES 1 to 5, inclusive, of the drawings, reference numeral 10 designates, in general, an electrical junction box constructed in accordance with the teachings of this invention. As shown throughout these several figures, the electrical junction box 10 is seen to include a substantially rectangular relatively thin metallic mounting plate 12 having first transversely extending substantially smooth openings 14 formed therein adjacent to but spaced inwardly from each corner thereof. Each opening 14 is adapted to receive therethrough suitable fastening means (not shown) to afford connection of the plate 12 with any suitable support such as, a wall, ceiling, joist, hanger, et cetera. As is seen in FIGURE 1, the openings 14 are each spaced equally from the adjacent side edges of the plate 12 with pairs thereof having their center lines falling on the diagonals thereof. To serve a function to be described below, the plate 12 is provided with a plurality of second transversely extending smooth openings 16 disposed adjacent each marginal edge thereof and with the center points of each opening 16 falling on a center line drawn between each pair of adjacent openings 14. As is seen in FIGURES 1 and 5, one such opening 16 is provided in each marginal edge of the plate 12, and each of the openings 16 is offset from planes bisecting each opposed pair of edges of the plate 12. The plate 12 is further formed with pairs 18 of third transversely extending openings spaced inwardly from each corner of the plate 12 with the pairs of openings 18 having center points falling on a line substantially perpendicular to each diagonal of the plate 12 and laterally spaced equidistant therefrom. And finally, the plate 12 is provided with a fourth transversely extending opening 20 which is substantially centrally located with respect thereto.

The electrical junction box 10 further includes a substantially quadralateral base plate 22 formed of an electrically non-conductive material. The base plate 22 is adapted to be superimposed against a side of the mounting plate 12 in concentric relation relative thereto. As is seen in FIGURES 2 and 3 of the drawings, the base plate 22 has a smaller periphery than the periphery of the mounting plate 12 whereby the side edges thereof are spaced inwardly from the adjacent edges of the plate 12 so as not to obstruct the openings 14, 16 to which reference has been made above.

First pairs of transversely extending openings 26 are disposed adjacent each corner of the base plate 22 and each opening of the pair of openings 26 has its center point falling on a line drawn therebetween which extends perpendicular to a diagonal of the base plate 22, and with the center points being displaced laterally equidistant therefrom. Each opening forming the pair of openings 26 may be, optionally, internally threaded as at 28. The pairs of openings 26 are adapted to be aligned, respectively, with one of the pairs of openings 18 with the aligned pairs of openings 18, 26 receiving therethrough the externally threaded screws 30 whereby the base plate 22 is releasably secured to the mounting plate 12. The base plate 22 further includes a plurality of second transversely extending openings 32, there being one such opening 32 in each marginal edge thereof. The openings 32 disposed in opposed marginal edges of the base plate 32 have their respective center lines falling on vertical planes which are disposed at right angles relative to one another and which bisect each pair of opposed edges of the plate 22. Each of the openings 32 receives therein internally threaded sleeves 34 having laterally and outwardly extending circumferential flanges 36 to fixedly secure each of the sleeves 34 to the base plate 22.

The exposed side of the base plate 22 is provided with an inwardly extending substantially rectangular recess 38 having a substantially planar floor 40. Extending inwardly from the aforementioned exposed side of the base plate 22 are a plurality of substantially U-shaped grooves 42, 44, 46, 48, 50, 52, 54 and 56, each having ends opening into the plane of the side walls of the base plate 22. Thus, the pair of grooves 42, 44 (see FIGURE 5) have one of their ends opening into the plane of the side 58, the pair of grooves 46, 48 have one of their respective ends opening into the plane of the side 60, the pair of grooves 50, 52 have one of their respective ends opening into the plane of the side 62, and the pair of grooves 54, 56 have one of their respective ends opening into the plane of the side 64. The opposed inner ends of all of the aforementioned grooves 42, 44, 46, 48, 50, 52, 54 and 56 all open into the recess 38. The last mentioned grooves are each formed with a bottom wall 66 which is substantially coplanar with the floor 40, and each of the U-shaped grooves aforementioned are further defined by opposed pairs of outer and inner side walls 68, 70 disposed in spaced, parallel and confronting relationship relative to one another and which are contained in planes substantially perpendicular to the plane of their respective associated bottom wall 66. Each of the grouped and adjacent pairs of grooves 42, 44–46, 48–50, 52–and 54, 56 have inwardly diverging longitudinal axes whereby the pairs of grooves opening into a common side of the base plate 22 define therebetween a plurality of truncated triangular separators 72, each defined by an adjacent pair of inwardly diverging side walls 70 and an inwardly disposed base wall 74 which extends substantially parallel to the adjacent one of the sides 56, 60, 62 and 64 of the base plate 22. As is seen in FIGURE 5 of the drawings, the base walls 74 are disposed in planes which serve to define the outer peripheral edge of the recess 38, and it should be further noted that each of the truncated triangular separators 72 contain one of the transversely extending openings 32 in which is mounted the internally threaded sleeve 34. To serve a function to be described below, the base plate 22 is further provided with a centrally located transversely extending opening 76 which, when the base plate 22 is connected in the manner described above to the mounting plate 12, is coaxially aligned with the central opening 20.

Referring now more specifically to FIGURE 5 of the drawings, reference numerals 78, 80 each designates a a pair of substantially identical electrically conducting plates which may be stamped, cut or otherwise formed of any desirable relatively thin resilient metallic material. The conducting plates 78, 80 being identical are, of course, interchangeable, one with the other. Each conductor plate 78, 80 comprises an elongated substantially rectangular main body portion 82 which terminates, at its opposed ends, in end tabs 83, 84 offset in the same direction relative to the main body portion 82 in such a manner that their respective axes intersect the longitudinal axis of the main body portion 82 at an obtuse angle. Projecting laterally from one side edge of each of the main body portions 82 and extending in the same direction as the diverging end tabs 83, 84, is an elongated substantially rectangular arm 86 which, in its turn, also terminates in an end tab 88. As is seen in FIGURES 1 and 5 of the drawings, the arm 86 is located substantially adjacent to but is spaced inwardly from the end tab 83, and the longitudinal axis of the arm 86 is positioned substantially perpendicular to the longitudinal axis of the main body portion 82. The longitudinal axis of the end tab 88 intersects the longitudinal axis of its associated arm 86 in an obtuse angle.

Each of the main body portions 82, adjacent their respective other ends, is formed with a second arm 90 shorter than the arm 86, and the second arm 90 also terminates in an end tab 92 offset with respect to its associated arm 90, and the longitudinal axis of each end tab forms an acute angle with respect to the longitudinal axis of its associated arm 90.

The longitudinal axes of the end tabs 88 and 92 extend substantially parallel with respect to one another, and consequently, the tabs 88, 92 are parallel to one another and, as is seen in FIGURE 1 of the drawings, these tabs face towards one another.

Substantially centrally of the ends of each of the main body portions 82 laterally projects a relatively short flange 94 which extends in the same direction as the arm 86. The outer end of the flange 94 terminates in an upwardly extending tongue 96 which, at its outer terminal end, terminates in an offset guide tip 98 (see FIGURE 3). The tongue 96 is disposed in a plane substantially perpendicular to the flange 94, and the latter is substantially copalanar with the main body portion 82.

It will be noted from a consideration of FIGURE 5 of the drawings that all of the tab ends 83, 84, 88 and 92 are characterized by being bent laterally from the main body portion 82, the arms 86 and 90, all in the same direction and in a direction opposite that of the tongues 96.

Reference numeral 100 designates a relatively thin insulator spacer member having a substantially rectangular configuration and conforming to the configuration and size of the recess 40 in which the same is adapted to be received. To serve a function to be described below, the insulator spacer member 100 is formed with a centrally located transversely extending opening 102 and an offset elongated substantially rectangular and transversely extending slot 104.

To assemble the box 10, and with the base plate 22 being formed in the manner described above, either of the conductor plates 76, 80 may be now next assembled. Selecting the conductor plate 78, the main body portion 82 and the arm 86 are introduced into the recess 38 to superimpose the main body portion 82 and arm 86 against the floor 40. As the conductor plate 78 is placed in its superimposed position, the tab end 83 is engaged within the groove 42, the tab end 88 becomes lodged in the groove 46, and the tab ends 84, 92 are disposed, respectively, within the grooves 52, 54. The insulator spacer member 100, formed of any suitable electrically nonconducting material, is now introduced in the recess 38 substantially filling the same. In this position, the tongue 96 is passed through the slot 104 and the opening 102 becomes coaxial with the openings 76, 20. The insulator spacer member 100 in being so introduced into the recess 38 becomes superimposed against the main body portion 82 and the arm 86 of the conductor plate 78 and substantially covers the same with the exception of the tab ends which project therefrom.

The conductor plate 80 is now introduced into the recess 38 and the main body portion 82 and arm 86 thereof is superimposed against the insulator spacer member 100. In this superimposed position, the tab end 83 of the plate 80 becomes lodged in the groove 48, the tab ends 92 and 84 are disposed, respectively, within the grooves 52, 54, and the tab end 88 of the plate 80 becomes lodged in the groove 44. With the tab ends of the two plates 78, 80 disposed within their respective grooves, the tab ends substantially fill the same.

A substantially rectangular clamp block 106 is now introduced within the recess 38 and has a side thereof superimposed against the conductor plate 80. The clamp block 106 is configured so as to fit substantially snuggly within the recess 38 and, as is seen in FIGURES 2 and 3 of the drawings, the block of appreciable thickness and projects a material distance above the plane of the exposed side of the plate 22. The clamp block 106 in seating in the recess 38 receives the tongues 96 and their respective associated tips 98 within transversely extending elongated and substantially rectangular slots 108, 110 which are disposed in laterally spaced and confronting relationship relative to one another. As is seen in FIGURE 3 of the drawings, the inner ends of the slots 108, 110 are restricted as at 112, 114, respectively, to open into the plane of the exposed upper end 111 of the clamp block 106. The restricted openings or slots 112, 114 are of such size as to snugly receive therethrough the tines of a conventional male electrical connector plug. It should also be observed from FIGURE 3 that the slots 108, 110 are sufficiently large so as to permit the tongues 96 received therein to flex when the tines of the connector plug are inserted through the restricted openings 112, 114.

The clamping block 106 is also formed with a centrally located transversely extending cylindrical passage 116 which is counterbored at 118 to open into the plane of the upper end of the clamping block 106. The cylindrical passage 116 and its counterbore 118 are coaxially aligned with the openings 102, 76 and 20. The passage 116, the openings 102, 76 and 20 receive therethrough the shank 120 of a conventional screw having an enlarged head 122 which is received within the counterbore 118. The shank 120 receives thereon the conventional nut 124 to clamp the nut 124 to clamp the above described assembly securely to the plate 12. To those skilled in the art, it is obvious that a conventional rivet could be substituted for the screw and nut securing means described above.

Reference numerals 126 each indicate a trapezoidal shaped clamping jaw, each of which includes an elongated planar base side edge 128 and an opposed parallel planar side edge 130. The planar side edges 128, 130 are interconnected by the planar end edges 132, each of which forms a 45° angle with respect to the planar base edge 128. Each of the clamping jaws 126 is also formed with a centrally located transversely extending opening 134. The length of each planar edge 130 is substantially the length of any side of the clamping block 106, and the clamping jaws 126 are disposed in encompassing relationship relative to the clamping block 106 with the planar side edges 130 fitting substantially flush against the adjacent portion of the block 106. In this assembled position, the clamping jaws 126 extend across the outer marginal edge of the base 22 and the adjacent end edges 132 of each clamping jaw 126 abut one another to form a miter joint therebetween. In this position, the openings 134 of each clamping jaw 126 are aligned with the adjacent ones of the internally threaded sleeves 34 and the aligned openings 134 and sleeves 34 each receive therethrough a clamping screw 136. In this assembly each clamping jaw 126 spans a pair of grooves 42, 44–46, 48–50, 52 and 54, 56, and the base edges 128 of each clamping jaw 126 are coplanar with the adjacent planar side edges 58, 60, 62 and 64 of the base plate 22.

Reference numerals 138 each designate a clamp sleeve each of which includes an elongated substantially rectangular flange 140 having a centrally located aperture 142 extending transversely threrethrough. One end of each flange 140 terminates in a longitudinally extending arcuate sleeve 144. The clamping sleeves 138 correspond in number to the number of sides of the mounting plate 12 and are superimposed thereon with the apertures 142 being aligned with each, respectively, of the opening 16. The aligned openings 16 and apertures 142 receive securing bolts 146 therethrough, and this described assembly is maintained on the mounting plate 12 by means of nuts 148. As is seen in FIGURES 1, 2 and 3, the clamping sleeves 138 extend along the outer marginal edge of the mounting plate 12.

To utilize the junction box 10 it is only necessary that the same be positioned at a suitable junction point for a plurality of electrical circuits. Suitable fastening means (not shown) are then extended through the openings 14 to fixedly connect the mounting plate 12 on any desired support. While the junction box 10 as herein described above is of the four-way type, the several figures of the drawings illustrate its use in connecting two electrical circuits together. The connections are effected in the following manner.

With the mounting plate 12 fixedly connected to its support means, the user will unloosen the bolts 146 at appropriate sides of the mounting plate to permit the arcuate sleeves 144 of the clamping sleeves 138 to swing outwardly beyond the peripheral side edge of the mounting plate 12. The screws 136 are then loosened to permit the clamping jaws 126 to be moved in a direction away from their respective underlying slots and tab ends of the plates 78, 80, or optionally, the screws 136 may be completely disconnected from their associated sleeves 34 to permit the complete removal of the desired ones of the clamping jaws 126, all in the manner shown in FIGURE 1 of the drawings.

Thereafter, one of the terminal ends of a pair of armored cables 150, 152, each including a pair of insulated wires 156, 158 having bared ends 160, 162, respectively, is extended across the peripheral maginal edge of the mounting plate 12 to cause the bared ends 160, 162 to enter a pair of adjacent ones of grooves formed in the base plate 22 and to be superimposed over the tab ends of the conductor plates disposed therein. In the case of the cable 150, the wire end 162 is superimposed against the tab end 83 of the conductor plate 78 and the wire end 160 thereof is superimposed against the tab end 83 of the conductor plate 80. The adjacent one of the clamp sleeves 138 is then swung over or engaged about the adjacent end of the sheath 154 and its bolt 146 is then tightened to clamp the sheath against the marginal edge of the mounting plate 12. One of the removed clamping jaws 126 is then superimposed over the bared wire ends 160, 162 of the cable 150 and its connecting screw 136 is then tightened to clamp the bared wire ends 161, 162 tightly against the adjacent tab ends 83.

The bared wire ends 160, 162 of the cable 152 are then connected to the junction box in the same manner, but in this case, the wire end 162 is superimposed against the tab end 88 of the conductor plate 78 and the bared wire end 160 is superimposed against the tab end 92 of the plate 80. The circuits of the two cables 150, 152 are thus both electrically and mechanically connected.

It will be understood, of course, that one or two more circuits may be connected to the junction box 10 in exactly the same manner described above and under such circumstances one such circuit could be completed through the end tabs 84 of each conductor plate 78, 80 and the second additional circuit could be completed through the end tabs 92 of the plate 78 and 88 of the conductor plate 80. A fifth circuit may be connected to the box 10 by inserting the tines of an electrical connector plug through the openings 112, 114 and into the slots 108, 110 to effect connection with the tongues 96, of the plates 78, 80. The outwardly turned tips 98 serve to facilitate this engagement.

Under certain circumstances the fifth circuit connection means may not be desired. In such a case, the conductor plates 78, 80 may be made without their respective arms 94 and tongues 96, and the clamp block 200, having a passageway 202 extending transversely therethrough may be substituted for the block 106. In this modification, the shank 120 of the connecting bolt is extended through the passage 202. In all other respects the two embodiments of the invention are identical, one with respect to the other.

FIGURES 6 to 10, inclusive, illustrate a third embodiment of this invention under circumstances wherein it is desired to provide switch means in conjunction with the junction box for controlling a secondary circuit. In this modification of the invention, component elements finding their counterparts in the previously disclosed embodiments bear the same reference numbers but to which has been added a prime mark to effect a differentiation therebetween.

Thus, and referring to FIGURES 6 to 9 specifically, the junction box employs a mounting base 12' to which is secured a base plate 22', all in the manner described supra. The base plate 22' is provided with the same recess 38' which is in open communication with the U-shaped grooves 42', 44', 46', 48', 50', 52', 54', and 56'. In lieu of the conductor plates 78, 80 there is substituted three connector plates of which the first is here idenntified by reference numeral 300. The conductor plate 300 (see FIGURES 6 and 9) is shown as comprising an elongated substantially rectangular arm 302 having opposed ends from which longitudinally project end tabs 304, 306 laterally offset relative to the arm 302. The longitudinal axis of each end tab 304, 306 intersects the longitudinal axis of the arm 302 at an acute angle.

As is seen in FIGURE 6 of the drawings, the arm 302 is adapted to be disposed within the recess 38' and is superimposed directly on the floor 40' with the end tabs 304, 306 engaging within the grooves 42' and 50', respectively.

At 308 is indicated a substantially rectangular and relatively thin insulator spacer member similar to the spacer member shown in FIGURE 5 with the exception that the spacer member 308 is not provided with a slot such as the slot 104. As before, the spacer member 308 is formed with a transversely extending opening 310, and the spacer member 308 is disposed within the recess 38' and extends substantially thereacross.

The second conducting member of this embodiment of the invention comprises the L-shaped element bearing the reference numeral 312. The conductor member 312 includes a foot portion 314 having one of its ends integrally connected to one end of a leg portion 316 which projects laterally therefrom at substantially right angles with respect thereto. The other end of the leg portion 316 is integral with one end of an arm 318 which extends away therefrom in a direction opposite the foot section 314, and the arm 318 terminates in an end tab 320 offset with respect to the arm 318 and whose longitudinal axis forms an acute angle at its intersection with the longitudinal axis of its associated arm. The outer end of the foot section 314 terminates in a laterally projecting arm 322 which extends at right angles with respect thereto, and the other end of the arm 322 terminates in an upwardly turned substantially rectangular tongue 324. The tongue 324 is disposed at substantially right angles with respect to its associated arm 322.

Referring now again to FIGURE 6 of the drawings, it is seen that the conductor plate 312 is superimposed over the other or upper side of the insulator spacer member 308 with the foot section 314 paralleling the arm 302 over substantially half its length. The leg portion 316 parallels the adjacent marginal edge of the insulator spacer member or element 308 with its associated end tab 320 being disposed within the groove 44'.

The third of the conductor plates is shown in FIGURE 9 of the drawings and bears the reference numeral 326. The conductor plate 326 comprises an elongated substantially rectangular arm 328 which terminates, at one of its ends, in a laterally projecting tongue 330, and the other end of the arm 328 terminates in the end tongue 332.

As is seen in FIGURE 6 of the drawings, the arm 328 is superimposed on the insulator spacer plate 308 with the arms 314, 328 being disposed in laterally spaced and substantially parallel relationship relative to one another and with the tongues 324, 330 being disposed in laterally spaced and confronting relationship relative to each other.

The block 106' shown in dotted lines in FIGURE 6 is now superimposed over the arms 302, 328 with the tongues 324, 330 being received within the slots 108', 110', all as described above. The described assembly is now bolted or riveted together as before with the bolt or screw extending, in this instance, through the opening 310 of the insulator spacer plate 308.

A single pole, single throw switch is utilized in this modification, and this switch bears the general reference numeral 320. The switch 320 includes a substantially hollow rectangular housing 322 having an elongated substantially rectangular top wall 324 in which there is substantially centrally provided an elongated transversely extending rectangular slot 326. The housing 322 further includes a pair of integrally connected elongated and substantially rectangular side walls 328, 330 disposed in laterally spaced and substantially parallel relationship relative to one another, and an opposed pair of substantially rectangular end walls 332, 334 integrally connected with the top wall 324 and the aforementioned side walls 328, 330. The end walls 332, 334 are integrally formed with one end of a pair of identically constructed flanges 336 centrally apertured as at 338. Each of the flanges 336 diverges in directions outwardly of the housing 322. That side of the housing 322 oppositely disposed with respect to the top wall 324 is substantially open, and each end wall, adjacent each of its respective ends is provided with an inwardly turned foot 340 disposed in confronting relationship relative to the top wall 324.

Supported on each 340 is an elongated substantially rectangular platform 342 formed of any desirable substantially rigid electrically nonconducting material. The platform 342 extends across the housing 322 in laterally spaced and substantially parallel relationship relative to the top wall 324.

Reference numerals 344 each designate a pair of laterally spaced and elongated transversely extending slots which are formed in the platform 342 adjacent to but spaced inwardly from one end thereof. The slots 344 are disposed in confronting and substantially parallel relationship relative to one another, and each slot 344 receives therethrough the lower depending end of an elongated substantially rectangular metallic tongue 346. The upper end of each tongue 346 terminates in a laterally offset flange 348, and each flange 348 is secured to the upper side of the platform 342 as by rivets 350.

A carriage bears the general reference numeral 352 and comprises the switch actuator means. The carriage 352 comprises an elongated substantially rectangular hanger 354 having a substantially rectangular actuator button 356 integrally formed therewith and positioned centrally thereof. The actuator button 356 is provided with an internal substantially hollow cylindrical pocket 358 which opens into the plane of the underside of the hanger 354.

Reference numeral 360 denotes a bracket assembly. The bracket assembly 360 comprises an elongated normally horizontal and substantially rectangular bight 362 having a pair of laterally spaced and substantially parallel depending retainer flanges 366 integrally connected therewith and disposed intermediate its opposed ends. End walls 368, 370 are provided and depend from the bight 362 in the same direction as the flanges 364, 366. Projecting upwardly from the bight 362, substantially centrally thereof, is a stem 372 which is received for reciprocation within the pocket 358 of the actuator button 356. As is seen in FIGURE 7 of the drawing, the stem 378 is arranged in spaced concentric relation relative to the adjacent portions of the side wall of the pocket 358, and a helicoidal spring 380 is positioned in encompassing relative to the stem 372. One end of the spring 380 is adapted to engage against the inner end of the pocket 358 while the other end thereof seats against the bight 362. Confined within the end walls 368, 370 and the flanges 364, 366 is an elongated metallic roller having an axial length at least as long as the distance between the rivets 350.

As is seen in FIGURE 7, the hanger 354 is disposed within the casing 322 with the actuator button 356 projecting through the slot 326. As is clearly shown in FIGURES 6 and 10, the exterior configuration of the actuator button 356 is rectangular whereby its rotation within the slot 326 is prevented. The cylindrical roller 382 in its inoperative or in the open position of the switch 320 as illustrated in FIGURE 7 is biased to engage against the inner side of the platform 342, and in its operative or closed position of the switch 320, the button 356 is moved to the left as viewed in FIGURE 7 to cause the roller 382 to span and engage against the rivets 350 and to thereby close an electrical circuit to be described.

With the block 106' introduced, as before, within the recess 38', and receiving in its slots 108', 110' the tongues 330, 324, respectively, the assembly may be fixed connected together by means of the aforedescribed center bolt 116 and nut 124 which, in this instance, is received through the central opening 310 of the insulator member 308.

Clamping jaws 126' are now connected to the base plate 22' in such a manner as to span the two pairs of grooves 46', 48' and 54', 56' in the same manner as described above, and these clamping jaws are retained in their respective positions by means of the screws or bolts 136'. This leaves exposed the pairs of end tabs 304, 320 and 306, 322.

A first cable 150' is clamped to the mounting plate 12' by the clamping means 138' and a third cable 384 is similarly connected to the mounting plate. The bared wire terminal ends (not shown) of the cable 150' are now engaged against the end tabs 304, 320, and the bared wire terminal ends of the cable 384 (identical to the cables 150, 152) are now engaged against the end tabs 306, 332. The two remaining clamping jaws 126' are now extended over the grooves 42', 44' and 50', 52' after which the switch 320 is mounted on the block 106' by inserting the tongues 346 into the slots 108', 110' causing the same to make sliding engagement with the tongues 324, 330. In this position the apertures 338 of the flanges 336 become aligned with the oppositely positioned internally threaded sleeves 34' and elongated bolts or screws 136' are now passed through the apertures 338 for threaded engagement with their aligned sleeve 34'. Spacer collars 386 (only one being shown) are mounted on each of the screws 136' and are interposed between each of the flanges 336 and the clamping jaw 126' disposed immediately below.

Having described and illustrated several embodiment of this invention in detail, it will be understood that the same is offered merely by way of example, and that this invention is to be limited only by the scope of the appended claims.

What is claimed is:

1. An electrical junction box comprising
   a mounting plate having a peripheral marginal edge;
   base means secured on said mounting plate and formed of an electrical non-conducting material, said base means having an exposed peripheral marginal edge spaced inwardly from the peripheral marginal edge of said mounting plate;
   a plurality of electrically insulated electrical circuit means encompassed by said base means, each of said circuit means having at least one end tab extending across said peripheral marginal edge of said base means to accept a bared wire end thereon; and
   clamp means mounted on said peripheral marginal edge of said base means and including adjustable connecting means to draw said clamp means towards said base means to releasably secure each of said bared wire ends on its associated end tab, said clamp means being formed of an electrical non-conducting material.

2. An electrical junction box as defined in claim 1 and clamping means mounted on said peripheral marginal edge portion of said mounting plate for clamping a wire thereto adjacent its said bared end.

3. An electrical junction box as defined in claim 1 and means for connecting said base plate on said mounting plate;
   said peripheral marginal edge portion of said base means being provided with a plurality of inwardly extending grooves to receive the said tab ends therein; and
   said clamp means in its operative position spanning said grooves.

4. An electrical junction box as defined in claim 1 wherein
   said base means comprises a plate; and
   said electrical circuit means includes lengths of electrically conducting material.

5. An electrical junction box as defined in claim 1 wherein
   said base means comprises a plate having a peripheral marginal edge formed with a plurality of inwardly extending grooves to receive said tab ends therein;
   said clamp means includes a plurality of clamp jaws for super-imposition on said peripheral marginal edge of said base means and spanning said grooves; and
   adjustable means on each clamp jaw cooperating with means on said base plate operable to draw said clamp jaws into engagement with said peripheral marginal edge of said base plate and to effect the release of the same therefrom.

6. An electrical junction box as defined in claim 1 and switch means mounted on said base means for controlling at least one of said circuit means.

7. An electrical junction box as defined in claim 1 and means for connecting said base plate on said mounting plate;

said base plate having a plurality of inwardly extending spaced grooves formed therein;

said electrical circuit means comprising a plurality of lengths of electrically conducting materials spaced and electrically insulated from one another and with an end tab of each length being received within a selected one of said grooves;

said clamp means on said peripheral marginal edge of said base means comprising a plurality of jaws formed of an electrically non-conducting material, said jaws being disposed in end-to-end relationship relative to one another and being superimposed on said peripheral marginal edge of said base means to completely cover the same and to span said grooves; and said adjustable connecting means comprising an element on each clamp jaw engageable with, respectively, a member on said base plate, said elements being selectively operable to draw its associated clamp jaw into engagement with said peripheral marginal edge of said base plate and to release said clamp jaw therefrom.

8. An electrical junction box as defined in claim 1 wherein said mounting plate is substantially rectangular in configuration and is formed of a metallic material, means on said mounting plate affording connection thereof to support means;

said base plate being superimposed against a side of said mounting plate in substantially concentric relationship relative thereto;

said peripheral marginal edge portion of said base plate being spaced inwardly from the peripheral marginal edge portion of said mounting plate and said base plate having a recess formed therein mounted by its said peripheral marginal edge, and said peripheral marginal edge of said base plate having a plurality of grooves extending inwardly thereof and extending transversely thereacross;

said electrical circuit means comprising a plurality of electrically conducting members disposed within said recess in laterally spaced and electrically insulated relationship relative to one another, each of said electrically conducting members having an end tab disposed within, respectively, one of said grooves;

a block disposed within said recess;

means extending through said block and said mounting plate to secure said block within said recess and to thereby clamp said members between said base plate and said block; and said clamp means comprising a plurality of jaws formed of electrically non-conducting material adapted for superimposition against said peripheral marginal edge of said base plate and spanning said grooves formed therein.

References Cited

UNITED STATES PATENTS 2,808,449  10/1957  Nicholas _____ 174—59

LEWIS H. MYERS, *Primary Examiner.*

D. A. TONE, *Assistant Examiner.*

U.S. Cl. X.R.

339—198